US006594470B1

(12) United States Patent
Barnes et al.

(10) Patent No.: US 6,594,470 B1
(45) Date of Patent: Jul. 15, 2003

(54) SYSTEM AND METHOD FOR REMOTE MANAGEMENT OF CALL CENTER OPERATIONS

(75) Inventors: Jeff A. Barnes, Alpharetta, GA (US); Dean Harris, Marietta, GA (US)

(73) Assignee: Nortel Networks Limited, Quebec (CA)

( * ) Notice: Subject to any disclaimer, the term of this patent is extended or adjusted under 35 U.S.C. 154(b) by 0 days.

(21) Appl. No.: 09/428,656

(22) Filed: Oct. 28, 1999

(51) Int. Cl.⁷ .............................. H04B 7/00; H04M 5/00
(52) U.S. Cl. ................... 455/67.7; 45/517; 379/265.03; 379/265.1; 379/265.11; 379/266.01
(58) Field of Search .............................. 455/424, 67.7, 455/423, 67.1, 517, 69; 379/265.01, 265.02, 265.03, 265.04, 265.05, 265.06, 265.07, 265.08, 265.1, 265.11, 265.12, 265.13, 265.14, 266.01, 266.02, 266.03, 266.06, 266.1

(56) References Cited

U.S. PATENT DOCUMENTS

| | | | |
|---|---|---|---|
| 5,333,183 A | | 7/1994 | Herbert ................. 379/112.07 |
| 5,499,291 A | | 3/1996 | Kepley ................... 379/265.06 |
| 5,535,256 A | | 7/1996 | Maloney et al. ............. 379/309 |
| 5,555,297 A | * | 9/1996 | Ochy P. et al. ......... 379/265.03 |
| 5,692,126 A | | 11/1997 | Templeton et al. ......... 709/249 |
| 5,696,811 A | | 12/1997 | Maloney et al. ....... 379/265.07 |
| 5,790,798 A | | 8/1998 | Beckett, II et al. ......... 709/224 |
| 5,818,907 A | | 10/1998 | Maloney et al. ......... 379/32.01 |
| 5,864,616 A | | 1/1999 | Hartmeier ............... 379/265.03 |
| 5,884,144 A | * | 3/1999 | Chavez, Jr. et al. ......... 455/560 |
| 5,903,641 A | | 5/1999 | Tonisson ............... 379/265.12 |
| 6,088,442 A | * | 7/2000 | Chavez, Jr. et al. .... 379/265.03 |
| 2002/0097858 A1 | * | 7/2002 | Drobek et al. ......... 379/265.03 |

OTHER PUBLICATIONS

J. P. Systems, Inc., "NetCradle™ First PC Car Connectivity For The Palm Computing Platform," Web page, copyright 1998, 3 pages.
Nortel Networks, Inc., Bay Networks, BayStack 600 Series Wireless LAN Products, Web page, copyright 1999, pages 1–8.
Dacon Electronics, "AgentView97 and AgentLink97 Technical Product Overview", 11 pages.
SYMON Communications, Inc., "SYMON 2000 Instantly Delivers Critical Data—Empowering You To Shape Your Destiny," copyright 1998, 30 pages.

* cited by examiner

Primary Examiner—William Trost
Assistant Examiner—Rafael Perez-Gutierrez
(74) Attorney, Agent, or Firm—Hunton & Williams LLP

(57) ABSTRACT

A system and method to enable the remote supervision and operation of a call center over wireless network links. The invention pipes supervisory information from call centers, such as call waiting time, number of available of agents, oldest call waiting and other information and statistics to a remote transceiver which presents a supervisor with a user interface such as a graphical, textual or audible presentation depicting the state of the call center. The transceiver enables supervisors to remotely monitor the call center/network status, reconfigure and react to changes and exceptions on a real time basis no matter where they are located. A supervisor using the remote transceiver may transmit on the uplink to the call center a request for data, or commands for adjustment of the operation, such as rerouting of calls or direction to increase agents. The call center supervisor may therefore not just observe but supervise and adjust the operation of a call center, from within the site, across the country or internationally using network-enabled cellular or other wireless technology.

25 Claims, 6 Drawing Sheets

SYSTEM AND METHOD FOR REMOTE MANAGEMENT OF CALL CENTER OPERATIONS

FIELD OF THE INVENTION

The invention relates to the field of communications, and more particularly to the remote management of call center facilities using mobile transceivers.

BACKGROUND OF THE INVENTION

Call center facilities and services represent a multibillion dollar industry in the United States. Call centers are deployed by companies, government agencies and other organizations to field random incoming telephone calls for customer care, sales, emergency medical or other services, and to generate outbound calls. Call centers are equipped with telephone hardware similar to a private branch exchange (PBX) or a central office (CO)-based Centrex facility. Call centers receive calls through (800) numbers, network-enabled telephony ports and other channels, and may distribute automatically dialed outbound calls to customers or other recipients. These centers are staffed with teams of individual agents sitting at telephone-equipped workstations, often with computer displays, to service that traffic. Commercial call center architectures include the Nortel Networks Meridian™ 1 system, DMS-100 Centrex™ and others.

In many installations, call centers are managed according to real-time statistics and other information generated by the call center hardware. That data indicates the flow of telephone traffic through the facility and the status of the call center's resources in several categories. The families of information generally relate to statistics for queue operation, agent deployment by skill set, agent performance, and system operations. That information may include data such as the number and categories of agents, the average call wait time, the oldest call currently waiting, queue depth, skillset availability, service level, service quality, the average speed of answer, the number of calls abandoned before servicing by agents, the number of calls abandoned after servicing by agents, agent work schedule adherence, the total number of pending calls, calls by skill group, and other information.

This suite of frequently updated information indicates to one or more call center supervisors how promptly, accurately and efficiently services are being delivered. This information is typically presented on computer displays at the supervisor's desk or in the form of printed reports. In many large call center operations, these statistics may be flashed on an LED or other display, sometimes called a wallboard, in full view of the operation room.

However, the use of electronic wallboard displays to track and manage call center operations has drawbacks. One is that the call center supervisor must be located in the same room as the agent workstations to see the runtime information. Further, the information displayed may be of a general nature for the entire call center, not specific to the supervisor's needs.

Some commercial systems have been developed, such as the Symon 2000™ system, which flash call center operations statistics on a computer display to computer-equipped supervisors and agents. This approach, however, has the disadvantage that the call center supervisor must be seated at a computer workstation, logged in and authorized to view the instantaneous updates as they occur. Moreover the categories of data to be displayed must be programmed beforehand in conventional computer as well as wallboard designs, so that timely adjustment of the types of information presented to the supervisor is not possible.

Other commercial call center equipment includes some type of wireless paging service, capable of transmitting call center statistics to the call center supervisor on an alphanumeric pager or other device. While this gives the call center supervisor the benefit of mobility, this method provides only periodic updates of information, typically associated with exception conditions rather than steady real-time or near real-time reports. No existing implementations allow the call center supervisor to continuously view the operation and then upload changes to the call center system, such as commands for reassignment of agents, setting up overflow queues and other management controls. More flexible and powerful call center technology is desirable.

SUMMARY OF THE INVENTION

The invention overcoming these and other problems in the art relates to a system and method for remote management of call center operations which employs a full duplex link from a mobile transceiver to the call center server or other hardware. According to the invention a call center supervisor may roam freely within a facility, surrounding building, campus, city or across the country or internationally depending on the type of transceiver employed, but with the ability to monitor the status of and communicate commands back to the call center system using the transceiver.

In one embodiment, the call center supervisor may use a wireless network-enabled personal digital assistant (PDA) device as a transceiver to view data on the wireless link and deliver input on the uplink to a call center server. The turnaround time for making adjustments to the call center operation is therefore reduced, and the call center supervisor can oversee the facility in a more responsive and flexible manner.

BRIEF DESCRIPTION OF THE DRAWINGS

The invention will be described with reference to the accompanying drawings, in which like elements are referenced by like numerals.

DETAILED DESCRIPTION OF PREFERRED EMBODIMENTS

Figure 1:
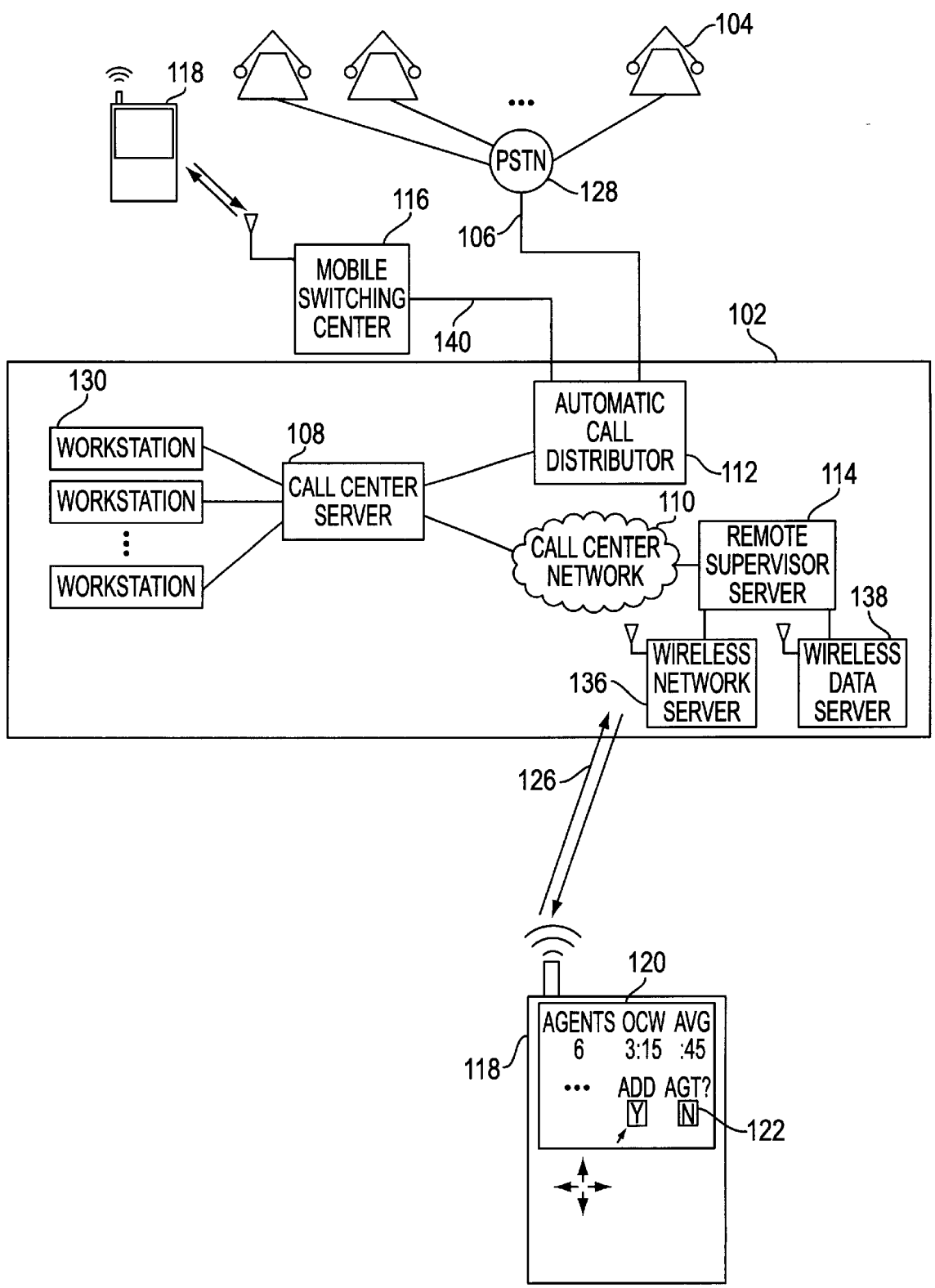
FIG. 1 illustrates an overall architecture of a call center network according to one embodiment of the invention.

An overall architecture of a call center 102 according to one embodiment of the invention is illustrated in FIG. 1. In this embodiment, one or more remote callers 104 dial into the call center 102 over a communications trunk 106 to receive sales, customer care or other service or support. Communications trunk 106 may be or include a telephone line provisioned as an (800) number to receive incoming service calls via the public switched telephone network (PSTN) 128.

Communications trunk 106 may also be or include as a segment any one or more of, for instance, the Internet, a DSL (Digital Subscriber Line) connection, an ISDN (Integrated Services Digital Network) line, a dial-up port such as a V.90, V.34 or V.34bis analog modem connection, or a cable modem connection. Communications trunk 106 for further example may be or include as a segment any one or more of wireless interfaces such as a GSM (Global System for Mobile Communication) cellular link, a CDMA (Code Division Multiple Access) or TDMA (Time Division Multiple Access) or other wired or wireless, digital or analog interfaces or connections.

Communications trunk 106 is in turn connected to an automatic call distributor (ACD) 112. The ACD 112 manages the intake and distribution of telephone calls within the call center 102. The call center server 108 is responsible for generating management information system (MIS)-type information about the call center operation, in the form of displays and printed reports. While illustrated as a unitary platform, it will be understood that the functions performed by the call center server 108 may be hosted in separate platforms to service these sets of responsibilities. For example, the call management function may be embedded in the telephone switching apparatus of the call center 102, while the MIS function may be assigned to a stand-alone information system within the facility, such as the Nortel Meridian™ Max, Symposium Call Center Server CCMIS, RT-1000, Lucent CMS, BCMS or other known hardware.

The call center server 108 may also be or include, for instance, a workstation running the Microsoft Windows™ NT™, Unix, Linux, Xenix, Solaris™, OS/2™, BeOS™, Mach, Apache, OpenStep™ or other operating system or platform software, or programmable hardware embedded within the telephone switching apparatus (PBX, CO, etc.) or switching network depending on implementation.

The call center server 108 is connected to call center data network 110, such as an internal corporate intranet, Ethernet, a LAN (Local Area Network), a WAN (Wide Area Network) or a MAN (Metropolitan Area Network) or other network configuration using a network communication protocol, such as TCP/IP.

Call center network 110 in turn may be connected to a number of network resources and ports. Those resources include supervisor or agent workstations 130 and an automatic call distributor 112, such as a PBX/CENTREX™ installation interfaced to the public switched telephone network 128. Those resources also include a remote supervisor server 114, which communicates with the call center server 108 as well as with communications facilities, such as a wireless network server 136 and a wireless data server 138, to manage the wireless delivery of call center information.

The wireless network server 136 may for instance be or include a radio frequency-enabled LAN platform, such as the commercially available BayStack™ 650 wireless LAN hardware for the delivery of duplex data services within the corporate site. The wireless data server 138 may be similarly provisioned to provide data conversion and other services for over-the-air operation.

Similarly, the automatic call distributor 112 may be connected via a data connection 140 to a mobile switching center 116 for transmission and reception of wireless communication signals, including digital or analog cellular telephone formats such as CDPD (cellular digital packet data) enabled devices.

Figure 3:
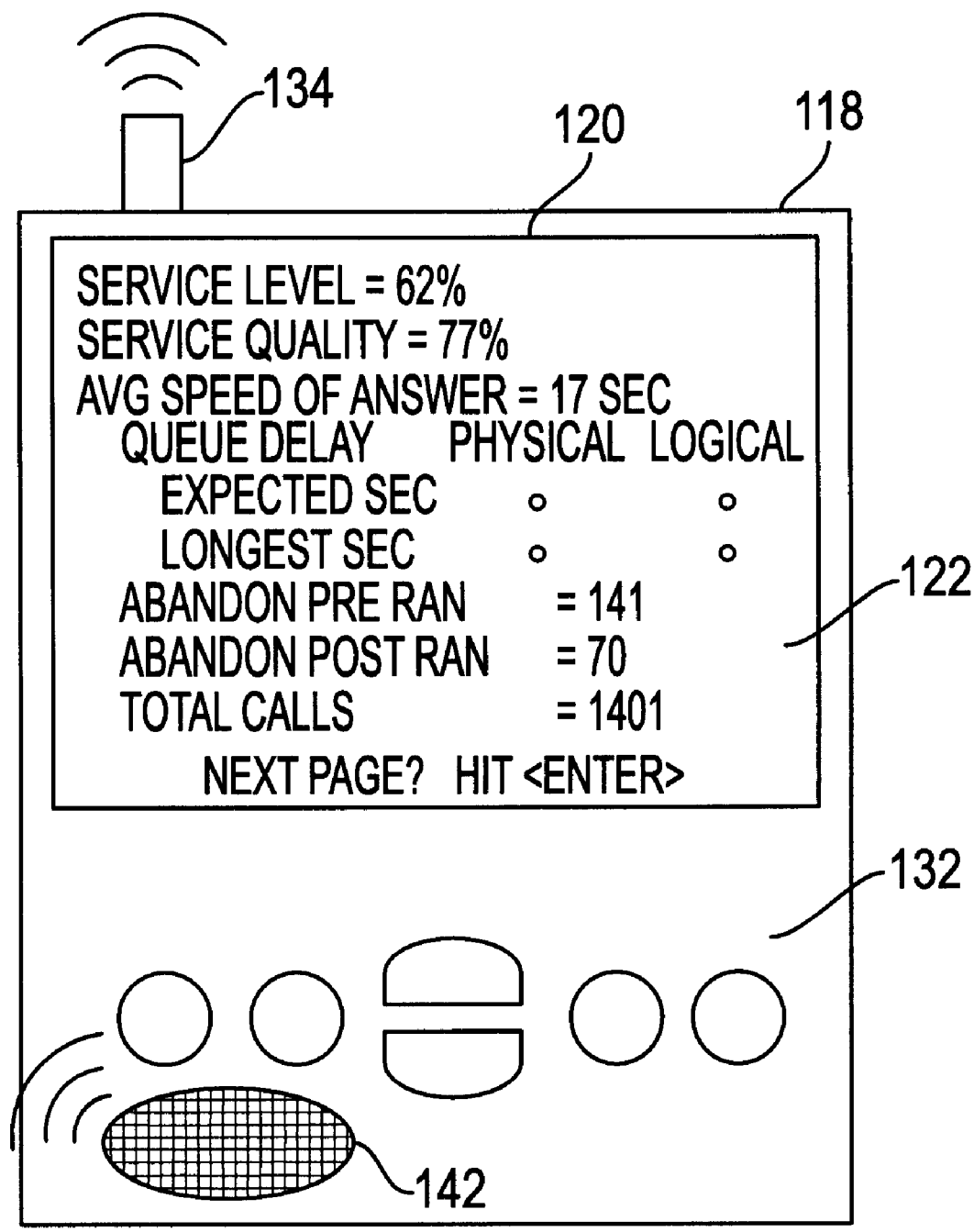
FIG. 3 illustrates a remote transceiver device according to one embodiment of the invention.

In the practice of the invention, a call center supervisor monitors and manages the call center 102 by operating a remote control transceiver 118 in communication with one or more data interfaces to the call center network 110 via wireless link 126. The wireless link 126 may be or include radio frequency channels in communication with wireless network server 136, mobile switching center 116 or other wireless ports. As illustrated in FIG. 3, the remote control transceiver 118 may be or include, for example, a personal digital assistant (PDA) such as a 3COM Palm™ Series equipped either internally or externally with a wireless interface, including RF radiating element 134.

The remote control transceiver 118 may likewise be or include a notebook computer equipped with a wireless network interface such as a PC Slot wireless card or AirPort™ interface, a Web browser-enabled digital cellular telephone such as the Qualcomm Smart Phone™, or other wireless mobile devices. Encryption of the over-the-air data may be provided by the wireless network server 136 or one or more native applications running on the remote control transceiver 118.

The remote control transceiver 118 includes a user interface 120 which displays a collection of call center operations information to the supervisor. The user interface 120 may be or include a graphical interface, a text interface, an audible interface or others.

The information presented via user interface 120 permits the supervisor to fully monitor and manage the call center 102 wherever that person may roam. The information may include for example the number of agents, the current categories of agents, the average call wait time, the oldest call waiting, queue depth, skillset availability, service level, service quality, the average speed of answer, queue delay, skillset availability, expected time and longest time, the number of calls abandoned before servicing by agents (sent to recorded announcement or RAN), the number of calls abandoned after servicing by agents, and the total number of pending calls. A variety of additional statistics and other information can be displayed.

The set of operations information presented on the remote control transceiver 118 can be collected, calculated and presented to the supervisor in a real-time or near real-time streaming mode, a periodic mode, in event-triggered modes or others. The set of working metrics on the call center operation is extensible, as will be appreciated by persons skilled in the art. The refresh cycle on the overall set of call center operations information may be on the order of 2 to 10 seconds or less, which is generally considered real-time for such facilities. The invention thus enables real-time or near real-time reporting on the state of call center 102.

The remote control transceiver 118 may also employ an audible device 142 such as a speaker to alert the supervisor to unusual conditions such as significant statistics exceeding preset thresholds, an equipment or network failure, emergency notification (e.g., bomb threats, fire) or other conditions requiring the supervisor's attention.

On the input side, the user interface 120 includes input modules 122 which permit the person carrying the remote control transceiver 118 to upload wireless instructions, adjustments or other commands using keypad 132 or other means to the call center 102 over wireless link 126. Other applications and utilities may be resident in the remote control transceiver 118, such as scheduling software or spreadsheet packages.

As implemented in the system illustrated in FIG. 1, the wireless link 126 may be or include an RF interface operating according to the IEEE 802.11 protocol and derivatives, for example. The IEEE 802.11 protocol in general implements a multichannel, duplex radio frequency link on the 2.4 GHz band operating on a single media access control (MAC) layer. When wireless link 126 is implemented on a site basis using an IEEE 802.11 protocol, data rates of 1 to 2 megabits per second or higher can be established for each of multiple channels.

It will be understood that other current and future wireless standards may be implemented in or as part of wireless link 126 in wide area network (WAN) or other configurations as part of call center network 110, including, for example, Cellular Digital Packet Data (CDPD) service devices, the Research In Motion (RIM) wireless duplex paging-type device, MOBITEX, ARDIX, RICHOCHET, TETRA or any future wireless ATM standard, European ETSI RES 10 protocol (operating on a 5 GHz band), the proposed Lucent Technologies SUPERNet (also on 5 GHz), local infrared ports and others.

During the operation of the call center 102, a supervisor who sees a large number of waiting calls or an increasing call waiting time by viewing the information on the remote control transceiver 118 may direct the call center 102 to assign more agents to given tasks during a certain interval of time. Inputs provided through the user interface 120 and input modules 122 may allow the supervisor to directly or indirectly effect updates or changes to the operation of call center 102. Those changes or adjustments may include the rerouting of some calls, scheduling maintenance, or performing other tasks, as for instance shown in FIG. 3. The remote control transceiver 118 may generate audible alerts via audible device 134 for significant operational states, such as excessive call waiting times or network faults, or other annunciation functions.

Unlike conventional call center management technology, in the practice of the invention the call center supervisor is able to implement real time adjustments and inputs to the call center 102 remotely via wireless link 126. The call center supervisor can therefore manage and direct operations without having to be physically located at the facility. If the remote control transceiver 118 is a wireless network-enabled cellular telephone, the supervisor may be at a location as remote as desired, within a metropolitan area, nationally or internationally and still view data and execute inputs and commands to the call center 102.

Figure 2:
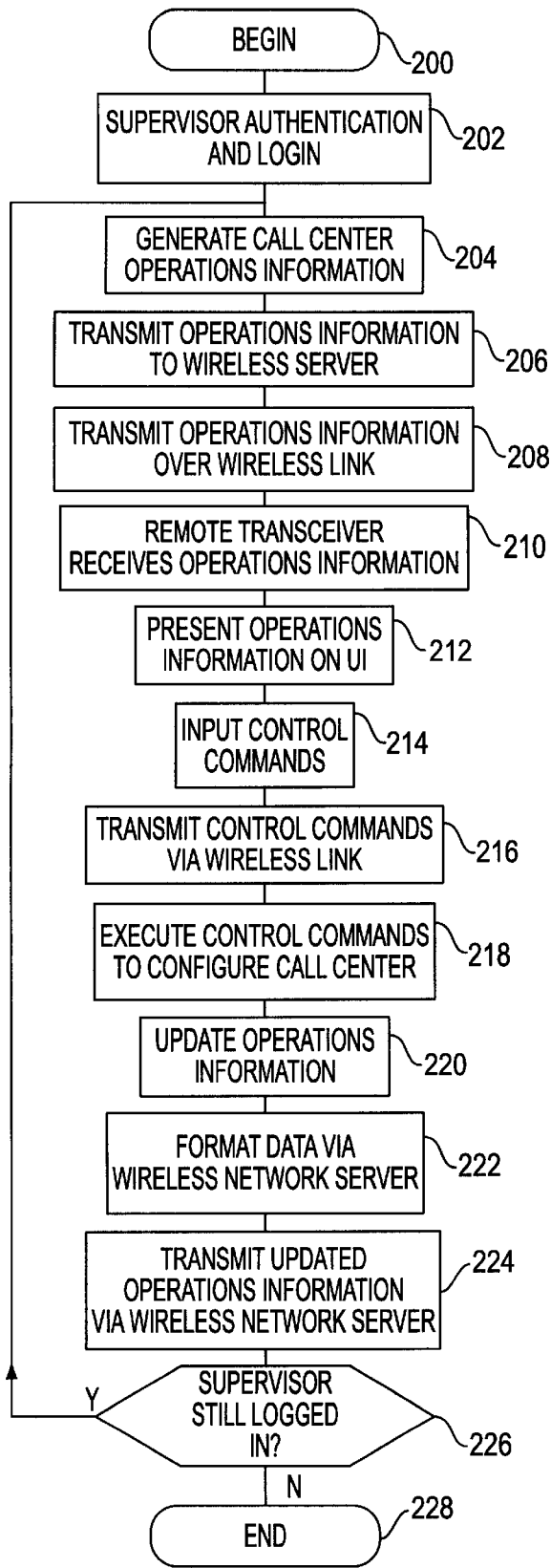
FIG. 2 illustrates a flowchart of call center operations according to one embodiment of the invention.

A general process of call center management according to the invention will be described with respect to FIG. 2. In step 200, processing begins. In step 202, the supervisor is authenticated and logs in. In step 204, the call center server 108 generates call center operations information including data such as number of operators, operator categories, average wait time, oldest call waiting, queue depth and other statistics and other information. In step 206, the call center operations information is transmitted to the remote supervisor server 114 on the internal call center network 110 for over-the-air delivery to the remote control transceiver 118.

In step 208, the call center operations information is transmitted over the wireless link 126, for instance, illustratively using the IEEE 802.11 protocol. In step 210, the call center operations information is received in remote control transceiver 118. In step 212, the call center operations information is presented on the user interface 120 of the remote control transceiver 118. In step 214, control commands are input by the call center supervisor using the input modules 122, for instance by keyboard, touch pad, voice input, pointing device input or otherwise.

In step 216, the control commands are transmitted on the uplink through the wireless link 126 to wireless network server 136, remote supervisor server 114 and call center server 108. In step 218, the call center 102 is configured according to the control commands received from the remote control transceiver 118. In step 220, the call center server 108 updates the call center operations information.

In step 222, the updated call center operations information is transmitted to the wireless network server 136 for formatting and transmission to the remote control transceiver 118. In step 224, the updated operations information is transmitted to the remote control transceiver 118, which displays the updated call center operations information on the user interface 120 to the supervisor.

In step 226, the supervisor's account is checked for logout, before iterating the process. If the supervisor is still logged in, control returns to step 204 for further generation of call center operations information and detection of command control inputs from the remote control transceiver 118. If the supervisor account has logged out, control proceeds to step 228 where processing ends.

Figure 4:
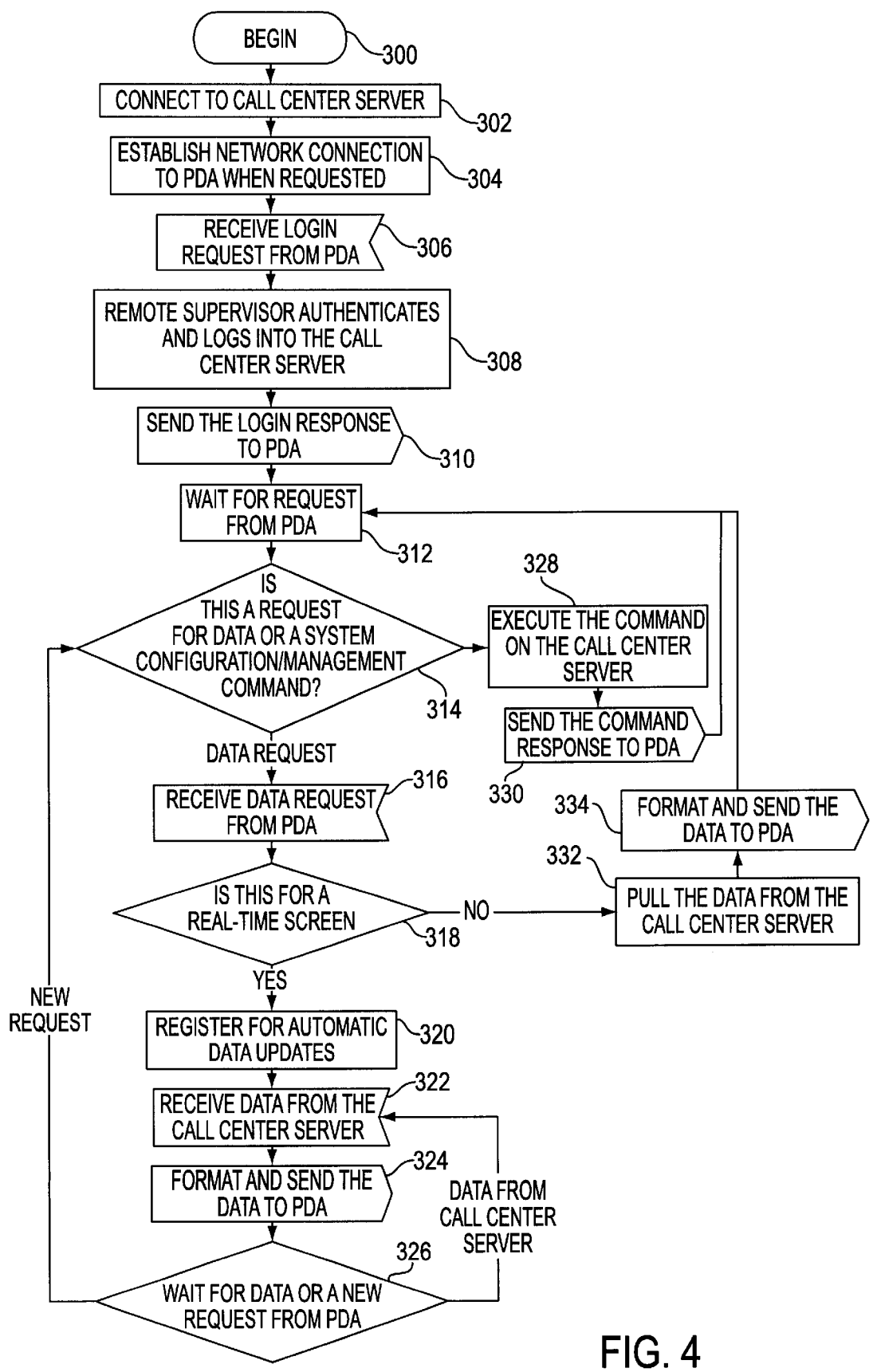
FIG. 4 illustrates a flowchart of processing by a remote supervisor server and associated elements according to one embodiment of the invention.

General processing by the remote supervisor server 114 will be described with reference to the flowchart of FIG. 4. In step 300, processing begins. In step 302, a network connection is established to the call center server 108. This connection may be in the form of a TCP/IP or other network protocol. In step 304, a network connection to the remote control transceiver 118 (illustratively a personal digital assistant or PDA) is established upon request by that device, such as at powerup of the unit. This connection may be in the form of the Point-to-Point Network Protocol (PPP) or other format over wireless link 126.

In step 306, a login request is received from the remote control transceiver 118 over wireless link 126. In step 308, the supervisor or other user using the remote control transceiver 118 is authenticated and/or logged into the call center server 108 by the remote supervisor server 114, for instance using password and other information.

In step 310, the login response from the call center server 108 is transmitted to the remote control transceiver 118. In step 312, receipt of a request from the remote control transceiver 118 is awaited. In step 314, a determination is made whether an arriving request from the remote control transceiver 118 is for operations data or to transmit a system configuration or management command on the uplink to call center server 108. If the request is for data, control proceeds to step 316 and the data request is received from the remote control transceiver 118, by way of wireless network server 136, mobile switching center 116 or other wireless interfaces.

In step 318, a determination is made whether the request is for a real-time update on operations information. If the request from the remote control transceiver 118 is for a real-time update, in step 320 the remote control transceiver 118 is registered with call center server 108 for automatic data updates. In step 322, operations information is received from the call center server 108. In step 324, the operations information is formatted and transmitted to the remote control transceiver 118 via wireless link 126.

In step 326, a wait state is entered awaiting further data for transmission to the remote control transceiver 118 or for a new data request to be received from the remote control transceiver 118. If a new request for data is received from the remote control transceiver 118, control returns to step 314 for a determination of the type of request. If no new request is received from the remote control transceiver 118, control returns to step 322 to receive any updated data from the call center server 108.

If the determination is made in step 318 that there is no request for a real-time update, control proceeds to step 332, in which operations information is retrieved from the call center server 108. In step 334, the operations information is formatted and transmitted to the remote control transceiver 118 via wireless link 126. After that non-real-time update, control returns to step 312 to await receipt of a request from the remote control transceiver 118.

In the determination of step 314, if the request received from the remote control transceiver 118 is to transmit system management commands, control proceeds to step 328 in which the call center server 108 receives and executes a command. In step 330, the response to the command is transmitted to the remote control transceiver 118, after which control returns to step 312 to await a further request from the remote control transceiver 118.

In this manner, call center server 108 monitors the remote control transceiver 118 for requests and commands and responds with operations data and reconfigurations according to input from the supervisor operating the remote control transceiver 118.

Figure 5:
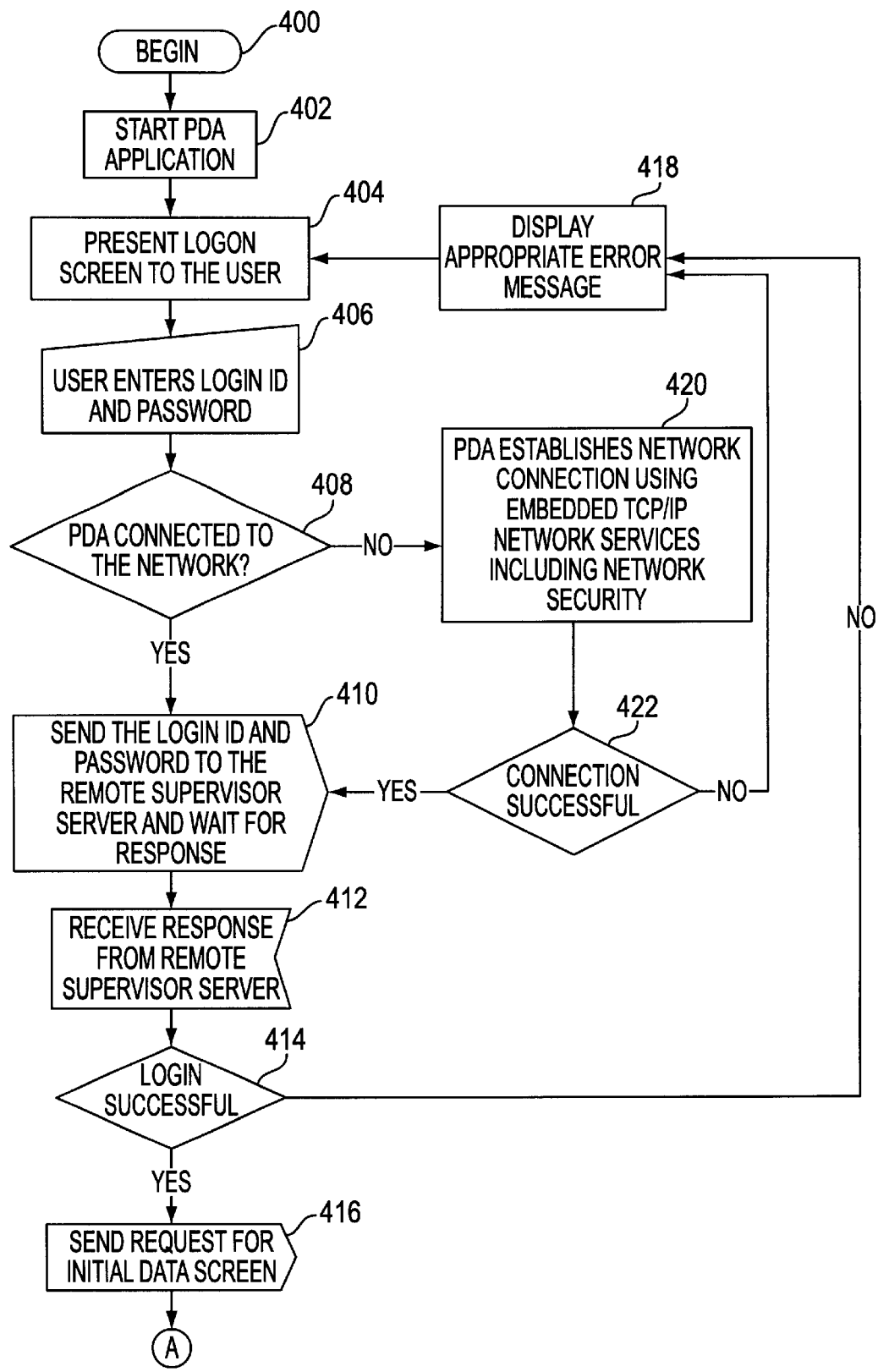
FIGS. 5 and 6 illustrate a flowchart of processing by a remote control transceiver according to one embodiment of the invention.

Processing in the remote control transceiver 118 will be described with reference to the flowcharts of FIGS. 5 and 6. In step 400, processing begins. In step 402, a local interface program running on the remote control transceiver 118 (again illustratively a PDA) is initiated. In step 404, a login screen is presented to the user of the remote control transceiver 118 on the user interface 120 or otherwise. In step 406, the supervisor user enters a login ID, password or other information.

In step 408, a determination is made whether the remote control transceiver 118 is connected to the call center network 110. If the remote control transceiver 118 is connected to the call center network 110, control proceeds to step 410 in which the login ID, password and other information is transmitted to the remote supervisor server 114 to await an authorization response.

In step 412, the remote supervisor server 114 generates a response to the login request sent to the call center server 108. The response is sent to the remote control transceiver 118. In step 414, a determination is made whether the login sequence of remote control transceiver 118 was successful. If login was successful, control proceeds to step 416 in which a request is transmitted for an initial data screen. If the login was not successful, control proceeds to step 418 in which an appropriate error message is displayed and control is passed to step 404 for repeat presentation of a login screen.

If in step 408 the determination is made that remote control transceiver 118 is not connected to the call center network 110, control proceeds to step 420 in which remote control transceiver 118 establishes a connection to the call center network 110 via wireless link 126 using embedded TCP/IP, PPP, or other network protocols. This connection may include integrated network security, for instance commercially available firewall, encryption, authentication packages, public/private key plug-ins or others.

In step 422, a determination is made whether the new connection has been successfully established. If it has, control proceeds to step 410 to transmit login ID, password or other information to the remote supervisor server 114. If the new connection has not been successfully established, control returns to step 418 for the display of an appropriate error message and return to step 404 for repeat presentation of a login screen.

Figure 6:
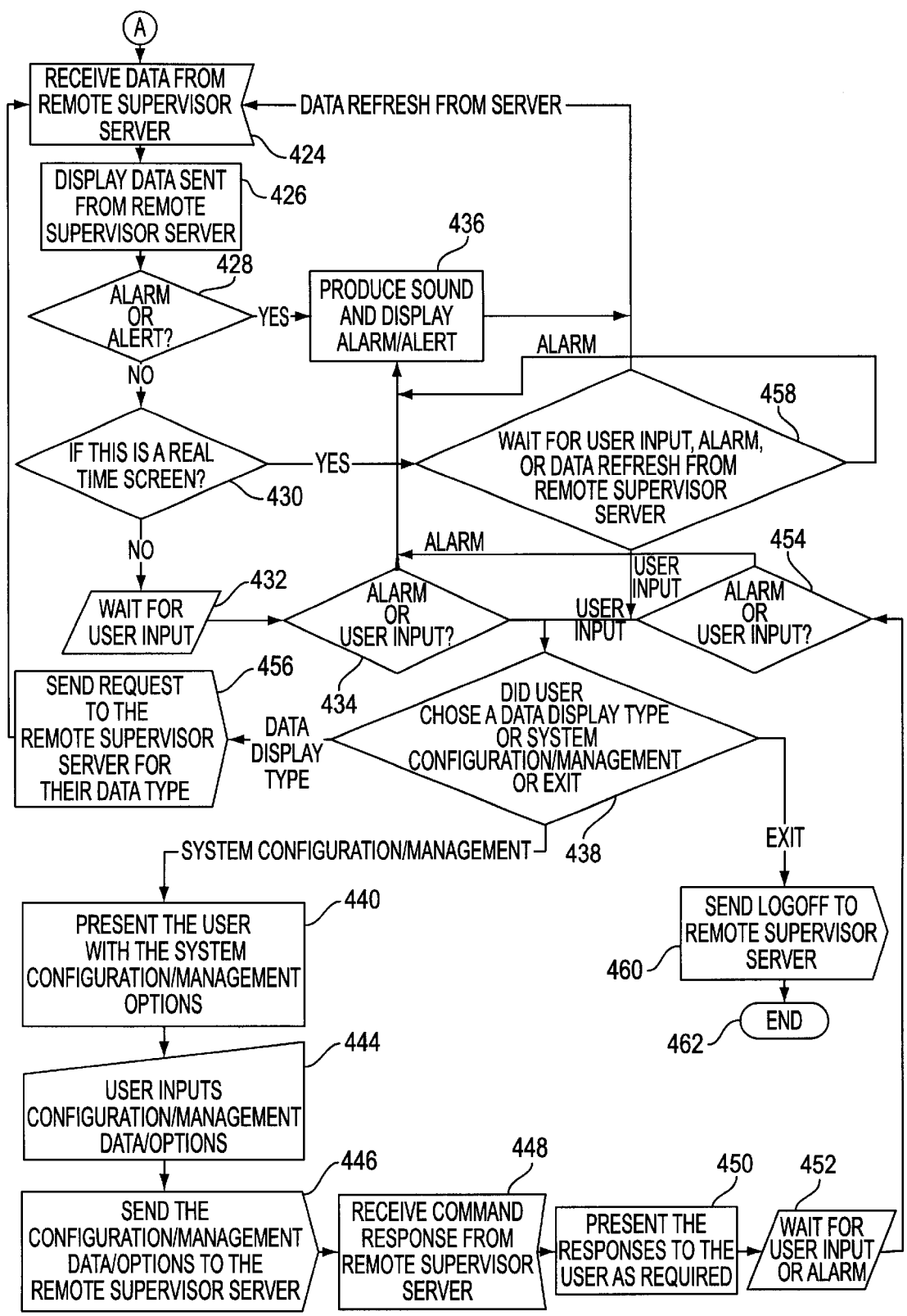

After login processing is complete, control proceeds to step 424 as illustrated in FIG. 6, in which data is received from the remote supervisor server 114. Remote supervisor server 114 is in communication with call center server 108 to receive and transmit call center operations information. In step 426, operations information transmitted from the call center server 108 via the remote supervisor server 114 and wireless network server 136 are displayed on the remote control transceiver 118.

In step 428 a determination is made whether an alarm or alert condition exists. If no alarm or alert condition exists, control proceeds to step 430 in which a determination is made whether the information is to be displayed in a real-time update. If the update is not a real-time update, control proceeds to step 432 to await further user input via user interface 120 or otherwise.

In step 434, a determination is made whether an alarm condition exists or user input is present. If user input is present, control proceeds to step 438 in which a determination is made whether the user chose a data display type or system configuration or management input, or an exit command. If the user chose a system configuration or management command, control proceeds to step 440 in which the user is presented with system configuration/management options.

In step 444, the user inputs configuration or management data or options to adjust one or more aspects of the operation of call center 102. In step 446, the configuration or management data or options are transmitted to the remote supervisor server 114. In step 448, the response of the call center 102 to the user's input is received from the remote supervisor server 114 on the remote control transceiver 118.

In step 450, the response of the call center 102 is presented to the user on graphical user interface 120 or otherwise, as required. After that presentation, in step 452 a wait state is entered to await further user input or an alarm condition.

In step 454, a determination whether an alarm condition or user input is present. If user input is present, control proceeds to step 438 for processing of the input received from the user.

If in either of the determinations of step 434 or 454 it is determined that an alarm condition exists, control proceeds to step 436 in which an alarm sound is generated on audible device 142 and an alarm or an alert message is displayed on the remote control transceiver 118. After that annunciation, control proceeds to step 458 in which further user input, alarm indications or data refresh from the remote supervisor server is awaited.

If in that state a data refresh arrives from the remote supervisor server 114, control returns to step 424 to receive the data from the remote supervisor server. If further alarm indications are present, control returns to step 436 to communicate that condition audible or visually. If in the wait state of step 458 further user input is received, control proceeds to step 438 to analyze the type of input received.

In step 438, if the determination is made that the user has made a command to exit the system, control proceeds to step 460 in which a log off command is sent to the remote supervisor server 114, and in step 462 processing ends.

The foregoing description of the system and method for remote management of call center operations is illustrative, and variations in configuration and implementation will occur to persons skilled in the art. For instance, while the remote control transceiver is illustrated as being a wireless network-enabled PDA, wireless network enabled cellular telephone or wireless network-enabled notebook computer, a variety of other devices maybe employed, as long as those devices are network compliant and capable of operating over a wireless link, such as a radio frequency, infrared or other link.

Similarly, while the remote control transceiver has been described as accepting input from a keypad or other tactile device, audible voice prompts and input using voice digitizing technology, as well as other types of input such as biometric security, may be accepted.

Likewise, while the call center architecture of the invention has been described in terms of functionality being distributed between a call center server, a remote supervisor server and other elements, it will be understood that the call center server, remote supervisor server and other elements may be combined in one computing or other resource, or be distributed amongst several other computing or other resources.

Moreover, while the invention has been generally described in terms of a single call center supervisor operating one selected remote control transceiver to control the call center facility, more than one remote transceiver may be distributed to more than one individual of the same or different capacities, so that different aspects of the call center operation maybe managed by different individuals at the same time. Multiple remote control transceivers can operate over different wireless networks at the same time, as well. The scope of the invention is accordingly intended to be limited only by the following claims.

What is claimed is:

1. A call center operation, comprising:
   a call center network;
   an operations server communicating with the call center network, the operations server generating operations information representing a state of the call center operation; and
   a remote supervisor server communicating with the call center network, the remote supervisor server operative to communicate via a wireless interface with at least one wireless transceiver to permit the at least one wireless transceiver to receive the operations information and transmit control information to the call center operation.

2. A system interface for the remote management of a call center operation, comprising:
   a data interface to an operations server, the operations server generating operations information representing a state of the call center operation; and
   a wireless interface communicating with the data interface, the wireless interface operative to communicate with at least one wireless transceiver to permit the at least one wireless transceiver to receive the operations information and transmit control information to the call center operation.

3. The system of claim 2, wherein the operations information comprises at least one of number of agents, categories of agents, average call wait time, oldest call waiting, queue depth, skillset availability, service level, service quality, average speed of answer, queue delay, expected time and longest time, the number of calls abandoned before servicing by agents, number of calls abandoned after servicing by agents, the total number of pending calls, calls by skillset, calls by phone number, and agent work schedule adherence.

4. The system of claim 2, further comprising a remote supervisor server communicating with the data interface and the wireless interface, the remote supervisor server operative to receive the operations information from the operations server, and transmit the operations information to and receiving the control information from the at least one wireless transceiver.

5. The system of claim 2, wherein the wireless interface comprises a wireless duplex link for transmitting the operations information from the call center operation to the at least one wireless transceiver and for uploading the control information from the at least one wireless transceiver to the call center operation.

6. The system of claim 2, wherein the wireless interface comprises a wireless LAN operating according to at least one of the IEEE 802.11 protocol, the CDPD protocol, the Ardis protocol, the Mobitex protocol, the Richochet protocol, and the Tetra protocol.

7. The system of claim 2, wherein the at least one wireless transceiver comprises at least one of a wireless network-enabled personal digital assistant, a network-enabled cellular telephone, and a wireless network-enabled portable computer.

8. The system of claim 2, wherein the control information comprises at least one of keyboard input, voice input, touch pad input, pointing device input, speech input and biometric input.

9. The system of claim 2, wherein the at least one wireless transceiver comprises an audible output device to output an indication associated with the operations information.

10. The system of claim 2, wherein the at least one wireless transceiver comprises a user interface for displaying the operations information and the control information.

11. The system of claim 2, wherein the call center operation comprises an (800) telephone line for receipt of incoming telephone calls.

12. The system of claim 2, wherein the at least one wireless transceiver comprises a plurality of wireless transceivers.

13. The system of claim 2, wherein the call center operation comprises a network-enabled telephony port.

14. A method for the remote management of a call center operation, comprising:
   (a) generating operations information representing a state of the call center operation; and
   (b) communicating the operations information over a wireless interface to at least one wireless transceiver, and receiving control information from the at least one wireless transceiver to manage the call center operation.

15. The method of claim 14, wherein the control information comprises at least one of number of agents, categories of agents, average call wait time, oldest call waiting, queue depth, skillset availability, service level, service quality, average speed of answer, queue delay, expected time and longest time, number of calls abandoned before servicing by agents, number of calls abandoned after servicing by agents, and the total number of pending calls.

16. The method of claim 14, wherein a remote supervisor server communicates with the data interface and the wireless interface, the remote supervisor server operative to receive the operations information from the operations server, and transmit the operations information to and receiving the control information from the at least one wireless transceiver.

17. The method of claim 14, wherein the wireless interface comprises a wireless duplex link for transmitting the operations information from the call center operation to the at least one wireless transceiver and uploading the control information from the at least one wireless transceiver to the call center operation.

18. The method of claim 14, wherein the at least one wireless interface comprises a wireless LAN operating on at least one of the IEEE 802.11 protocol, the CDPD protocol, the Ardis protocol, the Mobitex protocol, the Richochet protocol, and the Tetra protocol.

19. The method of claim 14, wherein the at least one wireless transceiver comprises at least one of a wireless network-enabled personal digital assistant, a network-enabled cellular telephone, and a wireless network-enabled portable computer.

20. The method of claim 14, wherein the at least one wireless transceiver comprises a plurality of wireless transceivers.

21. The method of claim 14, further comprising a step of (c) displaying the operations information on a user interface on the at least one wireless transceiver.

22. The method of claim 14, further comprising a step of (d) receiving incoming telephone calls on an (800) telephone line.

23. The method of claim 14, further comprising a step of (e) receiving incoming calls via a network-enabled telephony port.

24. The method of claim 14, further comprising a step of (f) receiving at least one of keyboard input, voice input, touch pad input, pointing device input, speech input and biometric input as the control information.

25. The method of claim 14, further comprising a step of (g) outputting an audible indication associated with the operations information.

* * * * *